United States Patent Office 3,492,863
Patented Feb. 3, 1970

3,492,863
PROCESS AND APPARATUS FOR DETERMINING THE TREAD GROOVE CRACKING TENDENCIES OF VEHICLE TIRES
Roy M. Vance, Princeton, N.J., assignor to Columbian Carbon Company, New York, N.Y., a corporation of Delaware
Filed Jan. 26, 1968, Ser. No. 700,910
Int. Cl. G01n *3/20;* G01m *17/02*
U.S. Cl. 73—100                                23 Claims

ABSTRACT OF THE DISCLOSURE

Process and apparatus in which a vehicle tire tread in the form of an endless belt moves over a series of pulleys so arranged as to subject the tread belt to the stretching, compressing, and flexing forces encountered in actual service. The pulley system can be enclosed in a housing in which the effects of various atmospheres and of either elevated or lowered temperatures may be determined. Means are also provided for distorting the tread belt so as to simulate both an over-inflated and an under-inflated condition.

BACKGROUND OF THE INVENTION

Field of the invention

This invention relates to a process and apparatus for determining the tendencies for groove crack formation and growth in the tread of a pneumatic vehicle tire. More particularly, it relates to a process and apparatus for determining such groove cracking tendencies under various forces and conditions simulating those to which said tread groove would be exposed in actual road service.

Discussion of the prior art

The fact that cracks may initiate and grow in tire tread grooves during the life of the tire is well known and of considerable significance to the art. At present, tread groove cracking is determined or measured by two general methods. One method calls for the actual running of the tire on a motor vehicle under prescribed test conditions. The second method calls for the testing of the tire on the National Bureau of Standards indoor test wheel under specified conditions. While these methods permit satisfactory observations and determinations to be made concerning groove cracking tendencies and other characteristics of the tire tread, they suffer the disadvantage of being relatively expensive, and in the case of the indoor test wheel, of requiring elaborate apparatus. While these well-known and established methods are very useful in an overall tire evaluation program, they are not entirely suitable where the test program is to be limited to a study of the groove cracking tendencies of the tire tread.

It is an object of this invention, therefore, to provide a relatively simple and inexpensive apparatus and process for determining the tendency for groove crack formation and growth in tire treads.

It is another object of the present invention to provide a simple and inexpensive apparatus and procedure for determining the tread groove cracking tendencies of tires under conditions simulating those encountered in actual road usage.

SUMMARY OF THE INVENTION

The present invention relates to an apparatus and process under which the tread portion of a tire can be flexed and distorted by means of a series of pulleys positioned so as to simulate the stresses to which the tread portion of the tire is subjected when in actual service on a motor vehicle or when tested on a standard indoor test wheel. The pulleys are so positioned with respect to one another that each side of an endless tread belt moving over the pulley system will be caused to "curve out around" at least one of said pulleys and also to "curve in against" at least one of said pulleys. When the tread side of the belt is curved out around a pulley, stretching of the tread portion is accomplished. When the tread side of the belt is curved in against a pulley, on the other hand, compression of the tread results. Thus, in one revolution around the pulley system, the tread belt is exposed to stretching and compressing actions that simulate the opposing actions to which the tread is exposed in actual usage.

At one or more points during the revolution of the tread belt around the pulley system, the tread belt may be squeezed so that the tread side is distorted to a convex contour that stretches the rubber in the tread grooves. This distortion simulates the condition of an over-inflated tire in actual road usage. At another point in the system, the tread belt may be squeezed so as to distort the tread side into a concave contour that compresses the rubber in the tread grooves. This distortion simulates an under-inflated condition to which the tire may be exposed in actual road usage.

Means are also provided for simulating various conditions to which the tire may be exposed so that the effect of these conditions on groove crack formation and growth may be studied. For example, means are provided for maintaining elevated or sub-ambient temperature conditions. Likewise, means are provided for exposing the tread belt to the various atmospheric conditions to which the entire tread may be exposed in usage.

BRIEF DESCRIPTION OF THE DRAWINGS

The novel features of the present invention are hereinafter set forth with reference to the accompanying drawings in which.

DETAILED DESCRIPTION OF THE INVENTION

As indicated above, the present invention comprises a series, or multiplicity, of pulleys adapted to receive an endless tire tread belt obtained from a pneumatic tire. In order to simulate the forces to which the tread is exposed in actual usage or in the standard indoor test wheel, the pulleys are positioned with respect to one another so as to cause each side of the belt to "curve out around" at least one of said pulleys and also to "curve in against" at least one of said pulleys. As used herein, the term "curve out around" is used to indicate the wrapping around a given pulley that occurs with respect to the side of the belt that is out of contact with the surface of the pulley in question. As the tread belt curves around a given pulley, the outer side of the belt, i.e., the side that is not in contact with the surface of the pulley, curves out around that pulley. In this curving out around a pulley, the outer side of the tread belt is stretched.

The term "curve in against," as used herein, denotes the corresponding effect to which the opposite, or inner, side of the belt is exposed. This side of the belt is the one in contact with the surface of the particular pulley around which the belt is moving. As the inner surface of the belt moves over the surface of the pulley in question, it is folded in upon itself or "curves in against" that particular pulley. As the inner side of the belt curves in against the pulley, this side of the belt is subjected to a compressing action.

Thus, the positioning of the multiplicity of pulleys in accordance with the present invention causes a tire tread belt to be subjected to both stretching and compressing forces during each revolution around the pulley system. While the number of pulleys employed in the practice of the present invention is not critical, it will readily be observed that an arrangement of at least four pulleys is needed in order to provide a pulley system in which each side of the belt will both curve out around and also curve in against at least one of the pulleys in the pulley system.

Figure 1:
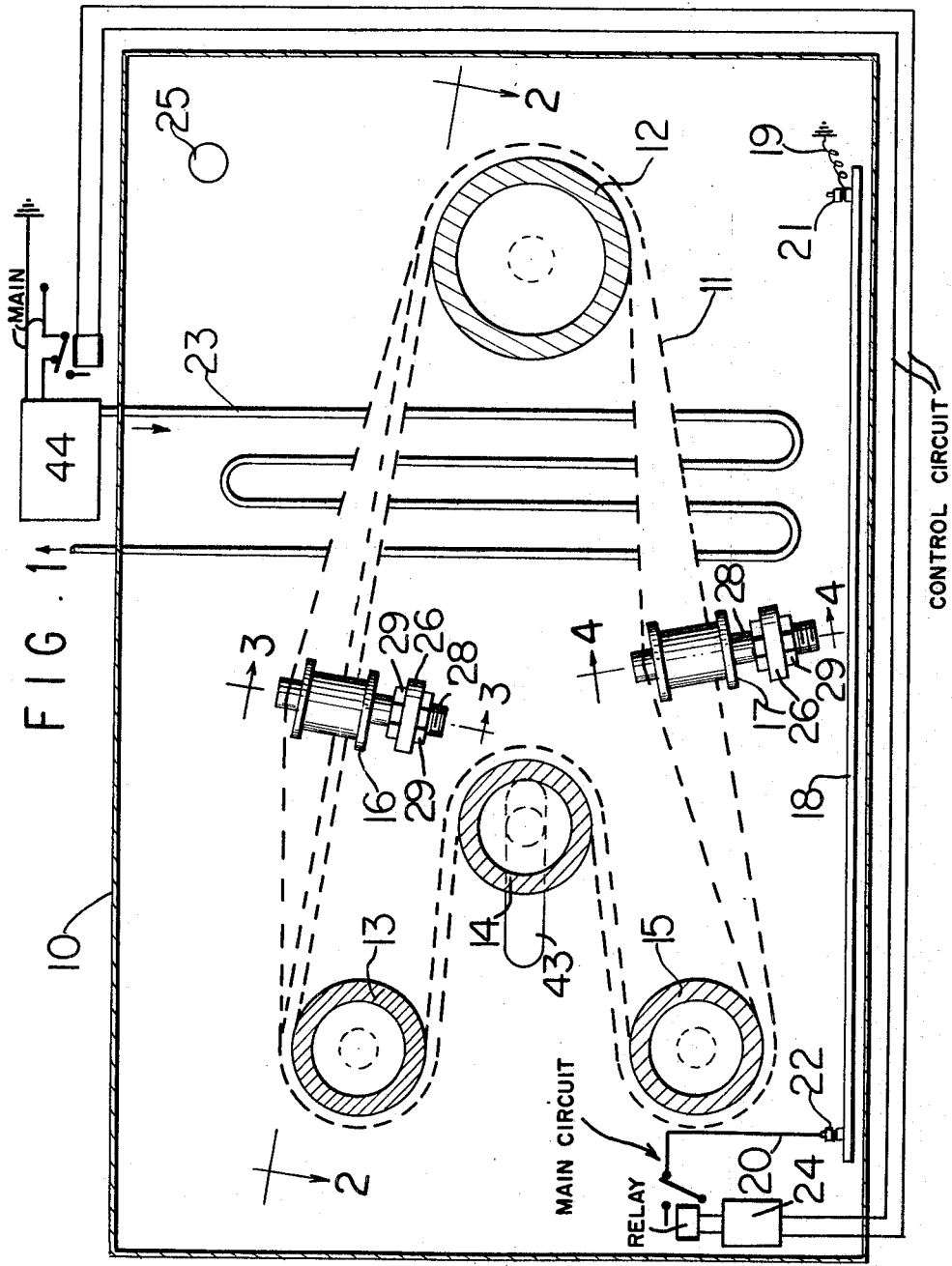
FIG. 1 is a longitudinal elevational view, in section, illustrating an embodiment of the apparatus of the present invention.

It will also be appreciated that in adding additional pulleys to the system in order to increase the amount of flexing between stretching and compressive forces encountered by the tread belt during its movement around the pulley system, it is convenient to add pulleys to the system in multiples of two. As illustrated in FIG. 1 of the drawing, the desired belt movement can readily be obtained in a four-pulley system by arranging three of the pulleys in a V-configuration with the apex of the V pointing toward the fourth pulley. Additional pulleys can be added to the pulley system as, for example, by adding two additional pulleys to form a second V-configuration adjoining the initial one. It is, of course, with in the scope of the present invention to also add one or more guide pulleys so that the pulley system may contain any desired number of pulleys.

The present invention does not require any specific amount of contact between the moving tread belt and any given pulley in the system. In order to assure a reasonable amount of stretching and/or compressing of either side of the tread belt at any particular pulley, it is generally desirable that the tread belt make contact with at least about half of the pulley surface during its movement around and over that particular pulley. It is, of course, possible that the tread belt will wrap around some pulleys to a greater extent than it wraps around others. This will be particularly true with respect to any guide pulleys that may be added to the system, e.g. to effect a non-essential change in belt direction. With respect particularly to such pulleys, the surface of the belt may contact only a small portion of the total surface of that particular pulley.

It is desirable that at least one pulley in the pulley system be movable in a manner so as to facilitate the placing of the tread belt on the pulley system. Desirably, this pulley can be moved laterally not only to facilitate the placing of the belt on the pulley system, but also to permit adjustment in the tension on the belt. Illustrative of the means by which a pulley can be moved to facilitate the positioning of the belt and the adjusting of the belt tension are an air ram connected to the pulley to be moved, and a sliding positioning guide with locking bolts for holding the movable pulley in the desired position.

Drive means must also be provided in order to move the tread belt in a revolving path over the pulley system. A motor-drive on one of the pulleys in the pulley system may conveniently be employed in order to provide the means for moving the tread belt over the pulley system. The speed of the motor that powers the drive pulley may be adjusted in order to change the r.p.m. of the drive pulley, thus varying the rate of rotation of the tread belt. By operating at various motor speeds, therefore, the effect of speed of rotation of the tread belt on tread groove cracking may be determined. While the rate of rotation of the tread belt is not a critical feature of the invention, it is generally desirable that the drive means permit very high and very low rotation rates so as to simulate actual road speeds, and variations therein, encountered by the tread in service on a motor vehicle.

The tire tread belt may be obtained from a pneumatic tire built and vulcanized by the methods commonly employed in the rubber industry. If desired, multiple section treads may be used to enable testings of the groove cracking tendencies of different tread compounds on the same tread belt. Conventional means are available for the manufacture of such multiple section treads in which, for example, four or more compounding formulations may be employed in the manufacture of a single tire. In addition, recapped tires with either single or multiple section treads may also be used in the practice of the present invention.

In the preparation of the tire tread belt for use in the present invention, the tread portion with underlying carcass is cut away from the side wall of the tire. The flat, endless tread belt is then ready for testing on the apparatus of the present invention. Alternatively, if a tread belt without carcass underneath is desired, the new tire or recap is built with a polymeric film between the tread stock and the tire carcass. The polymeric film precludes bonding of the tread to the carcass during vulcanization. Any suitable polymeric film can be used for this purpose as the particular nature of the polymeric film is not an essential feature of this invention. Samples of suitable polymeric films are those prepared from cellophane and polyethylene terephthalate.

In order to increase the flexibility and usefulness of the present invention, various additional features may be employed in order to simulate the various conditions encountered in actual road usage. For example, it is within the scope of the present invention to provide auxiliary pulleys so arranged as to permit a determination of the tread groove cracking tendencies of the tread belt under conditions approximating those found in over-inflated and under-inflated tires. For this purpose, at least one pair of auxiliary pulleys are positioned on either edge of the tread belt at some particular point in the belt cycle. Means are provided for moving these auxiliary pulleys toward or away from each other. When the pulleys are moved toward each other so as to contact the edges of the tread belt, continued movement of the pulleys toward each other will cause the belt to be squeezed into an arcuate contour. If the tread belt is squeezed so that the tread side of the belt assumes a convex contour with respect to the opposite side of the belt, the rubber in the tread grooves is stretched in a manner normally experienced in an over-inflated tire. The severity of the stretching of the rubber in the tread grooves can be varied by the degree to which the auxiliary pulleys are moved toward each other.

In a similar manner, the auxiliary pulleys may be so arranged that upon movement toward each other, the tread belt is squeezed so that the tread side of the belt assumes a concave contour with respect to the opposite side of the tread belt. When the tread surface is squeezed into such a concave contour, the rubber in the tread grooves is compressed in a manner normally experienced in an under-inflated tire. Again, the severity of the degree of compression of the rubber in the tread grooves may be varied by moving the auxiliary pulleys toward or away from each other. It can readily be appreciated that it is also within the scope of the present invention to provide more than one pair of such auxiliary pulleys, as for example providing one pair in order to force the tread side of the belt into a convex contour, while providing a second pair in order to force the tread side of the belt into a concave contour. In this manner, the present invention may be employed in order to determine the effect of over-inflation, under-inflation or a combination of these conditions in addition to the effects of stretching and compressing as heretofore indicated.

Figure 3:
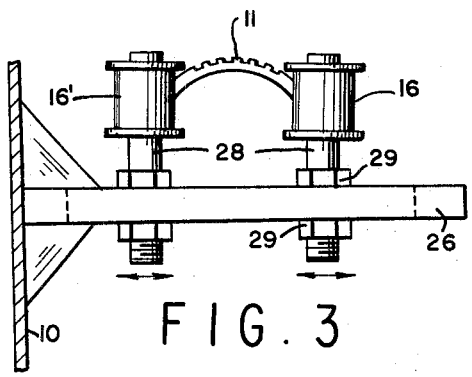
FIG. 3 is a transverse view taken along line 3—3 of FIG. 1, illustrating the embodiment in which auxiliary pulleys squeeze the tread belt so as to give the tread side a convex contour.
Figure 4:
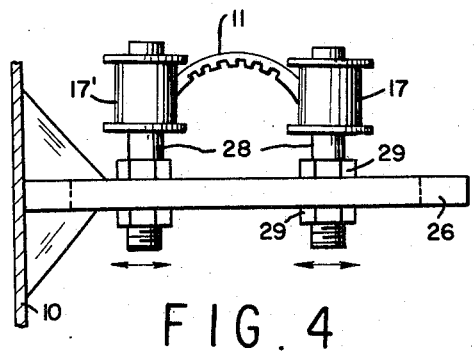
FIG. 4 is a transverse view taken along line 4—4 of FIG. 1, illustrating use of auxiliary pulleys to squeeze the tread belt so as to give the tread side of the belt a concave contour.

It should be noted that the auxiliary pulleys employed in order to give convex and concave contours to the tread belt may be identical in structure. The tread side of the belt is distorted into either a convex or a concave contour depending upon the relative position of the tread side with respect to the arcuate contour of the belt, as shown in FIGS. 3 and 4.

It is often desirable to simulate other conditions normally encountered by the tread portion of a tire in normal road service. Thus, it is desirable to provide means for determining the effect of both heat and cold on the groove cracking tendencies of the tire. In addition, the determination of the effect of various atmospheres on groove cracking tendencies is also a desirable feature of the present invention. For this purpose, the pulley system of the present invention may be enclosed within a housing in order to permit the desired conditions to be maintained during the test. The flexing of a pneumatic tire in service causes the temperature to increase to a normal operating temperature in the range of from about 100° F. to about 300° F. Within the housing, therefore, it is desirable to maintain elevated temperatures, as for example within the indicated range. Any convenient means may be employed, e.g. by positioning an electric resistance heater within the housing.

If it is desired to determine the groove cracking tendencies of a tread belt at a lower than ambient temperature, the temperature within the housing may conveniently be lowered as by circulating a refrigerant through cooling coils placed within the housing. The temperature range obtainable under refrigeration may conveniently be such as to maintain the tread belt at a temperature of from about −40° F. to about +100° F. The temperature within the housing may be maintained at any desired level by means of a conventional thermostat connected in the usual way to the heating circuit and the refrigerant circulating pump. The rate of heat build-up and the temperature of the tread belt under various operating conditions may be determined by means of a portable needle pyrometer.

The atmosphere within the housing will, of course, ordinarily be air. It is within the scope of the present invention, however, to replace the air by other gases. For example, an inert atmosphere, such as nitrogen or carbon dioxide, or a reactive atmosphere, such as one containing high levels of oxygen or ozone, may be provided within the housing when it is desired to determine the effect of these atmospheres on the groove cracking tendencies of the tire tread.

In order to more fully describe the present invention, reference is made to FIG. 1 of the drawings in which the housing is designated by the numeral 10. This housing is preferably, but not necessarily, made of metal and comprises the outer shell of the apparatus. Access to the interior of the shell may be through a hinged door or a removable panel, not shown, which will usually be in place during operation of the apparatus so that tread belt 11 undergoing testing is completely enclosed. At one end of the housing, idler pulleys 13, 14, and 15 are arranged in a V-configuration, with the apex of the V toward drive pulley 12 positioned at the opposite end of the housing. Tread belt 11 is placed over drive pulley 12 and over idler pulleys 13, 14 and 15. The tread belt is conveniently placed with the tread side as the outer side for ease of observation and convenience since the natural shape of the tread belt lends itself to this arrangement. In order to provide a means for adjusting the desired tension on the belt and to facilitate placing the belt over the pulley system, one of the pulleys, e.g. pulley 14, can be adapted to move laterally so as to place the desired tension on the belt. Moving pulley 14 so as to increase the tension on the tread belt corresponds to increasing the load on a tire in actual usage.

In order to squeeze the belt into arcuate contours, tread belt 11 is placed between auxiliary pulleys 16 and 16' and between auxiliary pulleys 17 and 17'. Each of these pairs of auxiliary pulleys is provided with means for moving the pulleys toward or away from each other. Illustrative of the various means for accomplishing this movement are pivotable arms with locking nuts, or conventional screw or worm type arrangements.

As shown in the drawings, the auxiliary pulleys are mounted upon a bar 26 having a longitudinal slot 27 therein, the bar being attached to the rear wall of the housing 10. The shafts 28 upon which the pulleys rotate are threaded at the outer end which extends through the slot 27. The pulleys may be moved toward or away from each other by sliding the shafts 28 within the slot to establish a desired spatial relationship. The pulleys may then be locked in place by securing nuts 29, which are threaded onto the shafts, against bar 26.

As shown in FIG. 3, pulleys 16 and 16' are so arranged that as they move together they will engage the edges of the tread belt and squeeze the belt so as to distort the tread side into a convex contour with respect to the opposite side of the belt. The rubber in the tread grooves, therefore, is stretched in a manner corresponding to that experienced in an over-inflated tire. By moving pulleys 16 and 16' toward or away from each other, the severity of the stretching of the rubber in the tread grooves may be altered.

As shown in FIG. 4, pulleys 17 and 17' are arranged so that upon movement toward each other, the belt is squeezed so that the tread side is distorted into a concave contour with respect to the opposite side of the belt. The assuming of this contour compresses the rubber in the tread grooves in a manner corresponding to that occurring in an under-inflated tire. By moving pulleys 17 and 17' toward or away from each other, the degree of compression of the rubber in the tread grooves may be varied.

Figure 2:
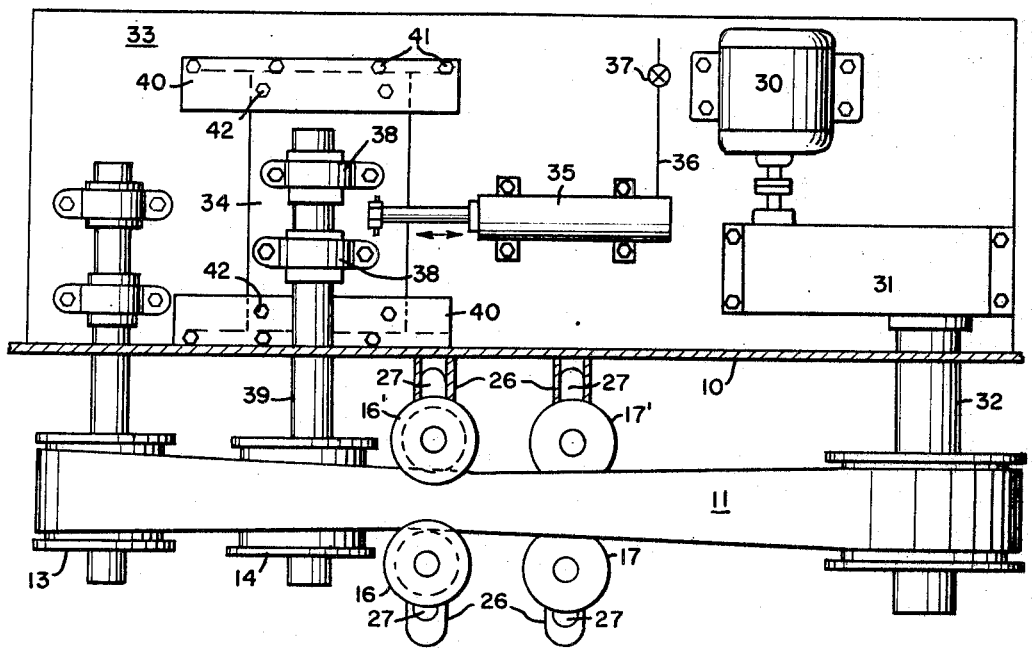
FIG. 2 is a top view taken along line 2—2 of FIG. 1.

Referring to FIGURE 2, the drive motor 30 rotates pulley 12 through a variable speed drive unit 31, the output of which is transmitted to shaft 32 which drives pulley 12, thus causing tread belt 11 to move over pulleys 12, 13, 14, and 15 and between auxiliary pulleys 16 and 16' and auxiliary pulleys 17 and 17'. As treat belt 11 moves over pulleys 12, 13 and 15 with the tread side out, the tread side of the belt curves out around pulleys 12, 13, and 15. The rubber in the tread grooves is thereby stretched. As the belt moves over pulley 14, as previously indicated, this may be accomplished by means of an air ram connected to the pulley to be moved, and a sliding positioning guide with locking bolts for holding the movable pulley in the desired position. Referring to FIGURE 2, a rigid mounting plate 33 is attached to the rear wall of the housing 10. A sliding positioning guide 34, in the form of a plate having a lower face which slides over the upper face of mounting plate 33, is moved back and forth by means of a pneumatic cylinder 35 having an air supply line 36 and control valve 37. The bearings 38 for shaft 39, upon which pulley 14 is mounted, are attached to positioning guide 34. Runners 40 maintain guide 34 abutted against the mounting plate and prevent oscillative or up and down motion which would cause pulley 14 to run out-of-true. The runners 40 are firmly attached to the mounting plate 33 by bolts 41. After the pulley 14 has been positioned by means of the pneumatic cylinder, guide 34 can be secured in place by tightening down the locking screws 42 which extend threadably through the runners 40. A slot 43, shown in FIGURE 1, permits lateral movement of the shaft 39 with respect to the rear wall of housing 10, on the other hand, the tread side curves in against pulley 14, thereby compressing the rubber in the tread grooves. If desired, both auxiliary pulleys 16 and 16' and auxilary pulleys 17 and 17' may be moved apart so that neither pair engages the tread belt. Likewise, either or both pairs of auxiliary pulleys may be brought together so as to distort the tread belt. It is possible, therefore, to determine the effects on groove cracking of over-inflation, under-inflation, or a combination thereof in one test.

As shown in FIG. 1, an electric resistance heater 18 having connecting wires 19 and 20 connected to binding posts 21 and 22, respectively, may be positioned inside housing 10. By controlling the flow of current through heater 18, the temperature within housing 10 may be maintained at any desired level and may be accomplished by means of a thermostat as represented by 24 in FIGURE 1. Means for maintaining the temperature within the range of from about 100° F. to about 300° F. is normally sufficient although it may also be desired to study the effects of even higher temperatures.

Alternatively, temperatures lower than ambient temperature may be maintained within housing 10 by circulating a refrigerant through cooling coil 23. Efficient cooling capacity should be available to permit the determination of groove cracking over a desired range of sub-ambient temperatures, as from about −40° F. to about +100° F. Thermostat 24 is provided and is connected in the usual manner to the heating circuit and to the refrigerant circulating pump as represented by 44 in FIGURE 1 in order to maintain the temperature at any desired level. While the atmosphere within housing 10 will ordinarily be air, the atmosphere can be changed by introducing a gas or gases into housing 10 through duct 25.

In the operation of the embodiment illustrated in the drawings, tread belt 11 is obtained from a tire in the manner previously described and is placed over pulleys 12, 13, 14 and 15 and between pulleys 16–16' and pulleys 17–17'. The desired degree of tension on the tread belt is obtained by adjusting the position of pulley 14.

Pulleys 16–16' and/or pulleys 17–17' may be moved toward one another so as to squeeze the tread belt and to distort the tread side thereof so as to simulate the effects of over-inflation and/or under-inflation on tread groove cracking. Effects of temperature on tread groove cracking can be determined by maintaining the interior of housing 10 at a desired temperature level by means of resistance heater 18 or cooling coil 23, together with thermostat 24. The tread belt is caused to rotate at a desired speed by suitably adjusting the speed of rotation of drive pulley 12. The effect of any particular atmosphere can be determined by introducing the desired gases within housing 10 by means of duct 25.

By means of the relatively simple and inexpensive apparatus and process of the present invention, therefore, it is possible to determine the tread groove cracking tendencies of vehicles tires quickly and simply under any or all of the conditions to which the tire tread grooves would be subjected in actual usage. The present invention facilitates the study and determination of groove crack formation and growth apart from the more costly and time consuming standard tests heretofore available in which groove cracking studies can be made only in conjunction with roadwear and other overall tire evaluation studies.

Therefore, I claim:

1. An apparatus for determining the groove cracking tendencies of pneumatic tire treads comprising:
    (a) a multiplicity of pulleys adapted to receive a tire tread belt and so positioned with respect to one another as to cause each side of said belt to curve out around at least one of said pulleys and also to curve in against at least one of said pulleys;
    (b) drive means for moving the tread belt in a revolving path over the aforesaid pulley system, and
    (c) at least one pair of auxiliary pulleys positioned on either edge of the tread belt and including means for moving said auxiliary pulleys toward each other so as to engage the edges of said tread belt and to distort said tread belt into an arcuate contour,
whereby the tread belt is subjected during its movement to both compressing and stretching forces simulating those to which a tire is subjected on an indoor test wheel or in service on the road.

2. The apparatus of claim 1 in which the pulley system comprises at least four pulleys.

3. The apparatus of claim 1 in which the drive means comprises a motor connected to one of the pulleys in the pulley system.

4. The apparatus of claim 1 and including a housing in which said multiplicity of pulleys is enclosed, whereby the temperature and atmosphere to which the tire tread belt is exposed during its movement over the pulley system may be readily controlled.

5. The apparatus of claim 4 in which the pulley system comprises four pulleys, three of which are arranged in a V-configuration at one end of the housing with the apex of the V toward the fourth pulley positioned at the other end of the housing.

6. The apparatus of claim 5 in which the three pulleys in the V-configuration at one end of the housing are idler pulleys, the pulley positioned at the other end of the housing is a motor-driven pulley, and the idler pulley at the apex of the V is capable of linear movement toward and away from said motor-driven pulley at the other end of the housing so that tension on the said belt may be adjusted by the linear movement of said pulley.

7. The apparatus of claim 6 in which said linear movement is accomplished by means of an air ram connected to said moveable pulley.

8. The apparatus of claim 4 and including means for maintaining the interior of the housing at an elevated temperature.

9. The apparatus of claim 8 in which said means for maintaining the interior of the housing at an elevated temperature comprises an electric resistance heater and a thermostat to control said heater.

10. The apparatus of claim 8 and including duct means for introducing a gas to said housing so that the effect of various atmospheres on the groove cracking tendencies of the tread belt may be determined.

11. The apparatus of claim 4 and including means for maintaining the interior of said housing at a temperature lower than ambient temperature.

12. The apparatus of claim 11 in which said means for maintaining the interior of the housing at a temperature lower than ambient comprises a cooling coil through which a refrigerant may be circulated, means for pumping said refrigerant through the coil and a thermostat to control the rate of circulation of said refrigerant.

13. The apparatus of claim 1 in which one of the pulleys is capable of linear movement in relation to the other pulleys so that the tension on the tread belt engaging the pulleys may be adjusted by said linear movement of the moveable pulley.

14. The apparatus of claim 9 in which two pairs of auxiliary pulleys are provided, said first pair of auxiliary pulleys positioned so that upon movement toward each other, they will engage the edges of said tread belt and squeeze said belt so as to distort the tread side thereof into a convex contour that stretches the rubber in the tread grooves so that the effects of over-inflation on groove cracking may be determined, and the second pair of auxiliary pulleys are positioned so that upon movement toward each other the edges of said tread belt are engaged and the belt is squeezed so as to distort the tread side into a concave contour that compresses the rubber in the tread grooves so that the effects of under-inflation on groove cracking may be determined.

15. The apparatus of claim 1 and including:
    (a) a housing within said pulley system is enclosed;
    (b) means for maintaining the interior of said housing at an elevated temperature;
    (c) means for maintaining the interior of said housing at a temperature lower than ambient temperature; and
    (d) duct means for the introduction of gas into the housing,
whereby the tread belt may be exposed to a variety of forces and conditions simulating those to which said tire tread would be exposed in an actual road test.

16. A process for determining the groove cracking tendencies of pneumatic tires comprising the steps of:
 (a) passing a tire tread belt continuously over a multiplicity of pulleys positioned with respect to one another so as to cause each side of said belt to curve out around at least one of said pulleys and also to curve in against at least one of said pulleys during the movement of the tread belt over the complete pulley system, and
 (b) squeezing the edges of said tread belt toward each other in at least one portion of the revolution of the belt and thus distorting the tread belt into an arcuate contour,
whereby the tread belt is subjected to both stretching and compressing force simulating those encountered by said tire tread on an indoor test wheel or in service on the road.

17. The process of claim 16 in which the edges of the tread belt are squeezed at one point in its revolution and distorts the tread side of said belt into a convex contour that stretches the rubber in the tread grooves and thus simulates the effect of over-inflation; and the edges of said tread belt, at a second point in its revolution, are squeezed and distorts the tread side of said belt into a concave contour that compresses the rubber in the tread grooves to simulate an under-inflated condition.

18. The process of claim 16 in which the tension on the tread belt is adjusted so as to vary the stretching and compressive forces to which said tire tread is exposed.

19. The process of claim 16 in which the tread belt is maintained at an elevated temperature.

20. The process of claim 19 in which the temperature is maintained within the range of from about 100° F. to about 300° F.

21. The process of claim 16 in which the tread belt is maintained at a temperature lower than ambient temperature.

22. The process of claim 21 in which the temperature is maintained within the range of from about −40° F. to about +100° F.

23. The process of claim 16 and including the exposing of said tire tread belt to a pre-selected gaseous atmosphere during its movement over the pulley system.

References Cited

UNITED STATES PATENTS

| | | | |
|---|---|---|---|
| 1,954,483 | 4/1934 | Krall | 73—100 |
| 2,514,202 | 7/1950 | Prettyman et al. | 73—100 |

DONALD O. WOODIEL, Primary Examiner

U.S. Cl. X.R.

73—146